(12) United States Patent
Iwai et al.

(10) Patent No.: US 9,008,022 B2
(45) Date of Patent: Apr. 14, 2015

(54) WIRELESS COMMUNICATION APPARATUS, ALLOCATED RESOURCE NOTIFYING METHOD AND DATA ALLOCATING METHOD

(75) Inventors: Takashi Iwai, Ishikawa (JP); Daichi Imamura, Kanagawa (JP); Akihiko Nishio, Kanagawa (JP); Yoshihiko Ogawa, Kanagawa (JP); Shinsuke Takaoka, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 35 days.

(21) Appl. No.: 13/702,901

(22) PCT Filed: Jun. 13, 2011

(86) PCT No.: PCT/JP2011/003337
§ 371 (c)(1),
(2), (4) Date: Dec. 7, 2012

(87) PCT Pub. No.: WO2011/161896
PCT Pub. Date: Dec. 29, 2011

(65) Prior Publication Data
US 2013/0089056 A1   Apr. 11, 2013

(30) Foreign Application Priority Data
Jun. 21, 2010  (JP) ................. 2010-140748

(51) Int. Cl.
*H04W 72/04* (2009.01)
*H04L 5/00* (2006.01)
*H04W 28/06* (2009.01)

(52) U.S. Cl.
CPC ............ *H04W 72/042* (2013.01); *H04W 28/06* (2013.01); *H04W 72/0453* (2013.01); *H04L 5/00* (2013.01)

(58) Field of Classification Search
CPC ... H04W 24/02; H04W 28/06; H04W 72/042; H04W 72/0453; H04J 3/1694
USPC ......... 370/328, 329, 338, 352, 278, 445, 334; 455/69, 413, 525
See application file for complete search history.

(56) References Cited

U.S. PATENT DOCUMENTS

| 7,991,004 B2 * | 8/2011 | Nishio et al. ................. 370/468 |
| 2007/0259672 A1 * | 11/2007 | Heo et al. .................. 455/452.2 |

(Continued)

FOREIGN PATENT DOCUMENTS

| CN | 101657018 A | 2/2010 |
| WO | 2011/020381 A1 | 2/2011 |

OTHER PUBLICATIONS

3GPP TSG RAN1#61,RI-I03158, Motorola,Resource allocation schemes for non-contiguous PUSCH, IViontreai, CanadaMay 10-14, 2010.*

(Continued)

*Primary Examiner* — Andrew Lai
*Assistant Examiner* — Mahmudul Hasan
(74) *Attorney, Agent, or Firm* — Seed IP Law Group PLLC

(57) ABSTRACT

Provided are a radio transmission apparatus and a radio transmission method whereby the increase of number of signaling bits can be suppressed and further the flexibility of frequency scheduling can be improved. A notified RBG calculating unit (203) that adds a predetermined offset value of "1" or "−1" to one of the start RBG number and the end RBG number of allocated RBG number information (b'i) output by a scheduling unit (201), thereby calculating notified RBG number information (bi). An RBG total number setting unit (204) calculates the total number of RBGs, which is to be notified, by adding "1" to the total number of allocated RBGs. A notified information generating unit (205) applies the notified RBG number information (bi) and the notified total number of RBGs (Nrb') to a predetermined formula, thereby generating and transmitting, to terminals, notified information (r).

8 Claims, 9 Drawing Sheets

(56) References Cited

U.S. PATENT DOCUMENTS

| | | | |
|---|---|---|---|
| 2009/0175231 A1* | 7/2009 | Seo et al. | 370/329 |
| 2009/0316814 A1* | 12/2009 | Seo et al. | 375/260 |
| 2009/0325585 A1* | 12/2009 | Farajidana et al. | 455/450 |
| 2010/0041344 A1 | 2/2010 | Kim et al. | |
| 2010/0069081 A1* | 3/2010 | Mitra et al. | 455/452.2 |
| 2010/0118807 A1* | 5/2010 | Seo et al. | 370/329 |
| 2010/0118814 A1* | 5/2010 | Ohseki et al. | 370/329 |
| 2010/0316011 A1* | 12/2010 | Lin | 370/329 |
| 2011/0085457 A1* | 4/2011 | Chen et al. | 370/252 |
| 2011/0201341 A1* | 8/2011 | Choudhury et al. | 455/450 |
| 2011/0222489 A1* | 9/2011 | Awad | 370/329 |

OTHER PUBLICATIONS

International Search Report, mailed Jul. 19, 2011, for International Application No. PCT/JP2011/003337, 2 pages.

Motorola, "Resource allocation schemes for non-contiguous PUSCH," R1-103158, Agenda Item: 6.2.6, 3GPP TSG RAN1#61, Montreal, Canada, May 10-14, 2010, 3 pages.

English Translation of Chinese Search Report dated Oct. 24, 2014, for corresponding CN Patent Application No. 201180023947.9, 2 pages.

Motorola, "Non-contiguous PUSCH resource allocation," R1-102128, 3GPP TSG RAN WG1 Meeting #60bis, Agenda Item 6.2.6, Beijing, China, Apr. 12-16, 2010, 5 pages.

* cited by examiner

| SYSTEM BW $=N_{rb}$ | SIGNALING BITS (L) |
|---|---|
| 25 RBGs | 14 |
| 50 RBGs | 18 |

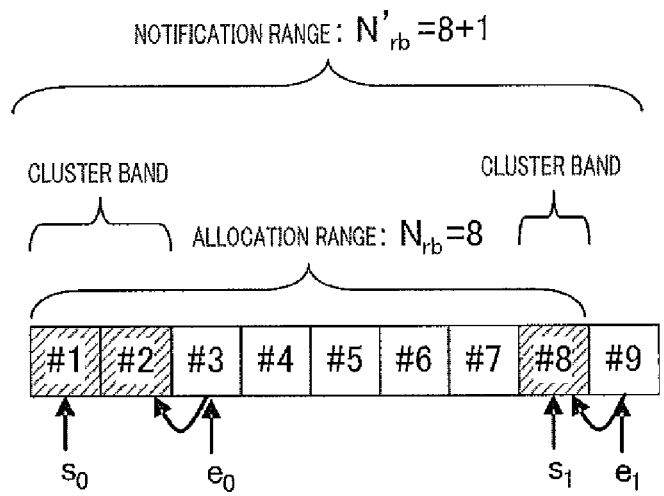
FIG.8
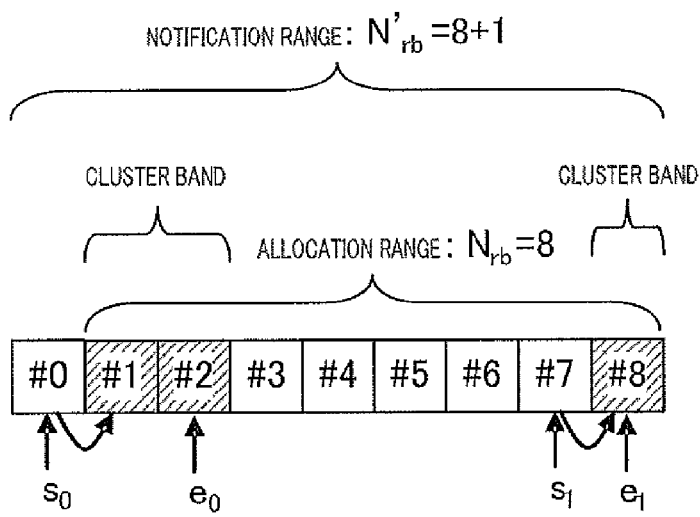
FIG.9
| SYSTEM BW = $N_{rb}$ | SIGNALING BITS (L) |
|---|---|
| 25 RBGs | 14 |
| 50 RBGs | 18 |
FIG.10

| $N_{rb}$[RBG] | CONVENTIONAL TECHNIQUE [bit] | PRESENT EMBODIMENT [bit] |
|---|---|---|
| 15 | 11 | 11 |
| 16 | 11 | 12 |
| 17 | 12 | 12 |
| 18 | 12 | 12 |
| 19 | 12 | 13 |
| 20 | 13 | 13 |
| 21 | 13 | 13 |
| 22 | 13 | 14 |
| 23 | 14 | 14 |
| 24 | 14 | 14 |
| 25 | 14 | 14 |
| 26 | 14 | 15 |
| 27 | 15 | 15 |
| 28 | 15 | 15 |
| 29 | 15 | 15 |
| 30 | 15 | 15 |

WIRELESS COMMUNICATION APPARATUS, ALLOCATED RESOURCE NOTIFYING METHOD AND DATA ALLOCATING METHOD

TECHNICAL FIELD

The present invention relates to a radio communication apparatus for reporting a frequency resource allocation and a method of reporting an allocation resource, and a radio communication apparatus for receiving a notification of an allocated frequency resource and a method of allocating data.

BACKGROUND ART

Studies are underway to apply a non-contiguous band transmission in addition to a contiguous band transmission to an uplink of LTE-Advanced, which is the development product of 3rd Generation Partnership Project Long Term Evolution (3GPP LTE), in order to improve sector throughput.

As shown in FIG. 1A, the contiguous band transmission is a technique used to allocate a transmission signal of one terminal to the contiguous frequency band. Meanwhile, as shown in FIG. 1B, the non-contiguous band transmission is a technique used to allocate a transmission signal of one terminal to non-contiguous frequency bands. Compared to the contiguous band transmission, the non-contiguous band transmission enhances flexibility of allocating the transmission signal of each terminal to the frequency band, and thus may obtain a larger frequency scheduling effect.

In LTE-Advanced, limiting the maximum number of clusters (i.e., contiguous band block or a unit) in the non-contiguous bands to two has been studied, in order to decrease the number of signaling bits of frequency resource allocating information that is reported from a base station to a terminal.

In the non-contiguous band allocation of LTE-Advanced, allocating a frequency resource to the terminal in a frequency unit referred to as an RB Group (RBG), which includes a plurality of RBs (Resource Blocks: 1RB=180 kHz), has been studied. The technique disclosed in non-patent literature 1 is known as a method of reporting RBG that the base station allocates to the terminal.

Non-patent literature 1 discloses that, in order to perform the non-contiguous band allocation, the base station converts a start RBG index and an end RBG index of each cluster to be allocated to the terminal into notification information r (i.e., combinatorial index) calculated by equation 1 and notifies the terminal of the result.

[1]

$$r = \sum_{i=0}^{2M-1} \binom{N_{rb}-b_i}{2M-i}, r \in \left\{0, \ldots, \binom{N_{rb}}{2M}-1\right\}$$

(Equation 1)

$$\text{in which } \binom{x}{y} = \begin{cases} \binom{x}{y} = {}_xC_y & x \geq y \\ 0 & x < y \end{cases}$$

$N_{rb}$ indicates the total number of RBGs, and M indicates the number of clusters. Also, $b_i$ indicates the i-th element of an information sequence in which the start and the end RBG indices of the clusters are arranged in order of cluster indices, which includes a start RBG index $s_i$ and an end RBG index $e_i$, i, e., an RGB index indicating a start or end position of cluster band, where i={0, 1, ..., 2M−2, 2M−1} holds true as for cluster index i, and is defined as below.

$b_i = s_{i/2}$ (when i is an even number)

$b_i = e_{(i-1)/2}$ (when i is an odd number)

In other words, $b_i = \{b_0, b_1, \ldots, b_{2M-2}, b_{2M-1}\} = \{s_0, e_0, s_1, e_1, \ldots s_{M-1}, e_{M-1}\}$ holds true. As shown in equation 2, $s_i$ and $e_i$ which are components of $b_i$ are defined in ascending order using different integers as shown in equation 2. According to this definition, the terminal can uniquely derive 2M RBG indices ($b_i$) from the reported notification information r.

$$s_i < e_i < s_{i+1} < e_{i+1}$$ (Equation 2)

Since "r" in equation 1 includes components corresponding to the number of combinations to select different 2M from $N_{rb}$, the number of necessary signaling bits L is represented by equation 3.

[2]

$$L = \left\lceil \log_2 \binom{N_{rb}}{2M} \right\rceil$$ (Equation 3)

FIG. 2 shows the numbers of signaling bits Ls, which is calculated by equation 3, at $N_{rb}$=25RBG and $N_{rb}$=50RBG in the case of M=2.

CITATION LIST

Non-Patent Literature

NPL 1
R1-103158, Motorola, "Control Signaling for Non-Contiguous UL Resource Allocations"

SUMMARY OF INVENTION

Technical Problem

FIG. 3 shows an example of non-contiguous band allocation at the number of clusters M=2 using a technique disclosed in the above-mentioned non-patent literature 1. As shown in FIG. 3, it is possible to allocate two clusters having different cluster bandwidths such as RBG indices 1 to 2 and RBG indices 6 to 8, respectively, by reporting RBG indices of $\{s_0, e_0, s_1, e_1\} = \{1, 2, 6, 8\}$ by r of equation 1.

However, RBG indices reported by r (i.e., combinatorial index) must be different from each other in order to uniquely derive the RBG indices from r. Accordingly, a cluster bandwidth of one RBG cannot be allocated to a terminal (for example, when two clusters such as RBG index 1 and RBG index 6 having the cluster bandwidth of one RBG are allocated, notification including the same RBG indices such as $\{s_0, e_0, s_1, e_1\} = \{1, 1, 6, 6\}$ is impossible). For this reason, frequency scheduling flexibility of a base station is decreased and therefore the improvement effect of a system performance due to the non-contiguous band allocation is limited.

It is an object of the present invention to provide a radio communication apparatus, a method of reporting an allocation resource, and a method of allocating data that limit an increase in the number of signaling bits and enhance frequency scheduling flexibility.

Solution to Problem

A radio communication apparatus of the present invention employs a configuration including: a scheduling section that determines frequency resource indices indicating a frequency resource to be allocated to a communication destination apparatus; a frequency resource information generating section that adds a predetermined offset value to a start index or an end index of the frequency resource to be allocated among the frequency resource indices, and generates notification information to be reported to the communication destination apparatus; and a transmission section that transmits the notification information.

The radio communication apparatus of the present invention employs a configuration including: a reception section that receives notification information that indicates frequency resource indices and that is transmitted by a communication destination apparatus; a frequency resource information calculating section that adds a predetermined offset value to a start index or an end index of a frequency resource based on the notification information, and calculates an allocated frequency resource; and an allocation section that allocates data to the allocated frequency resource.

A method of reporting an allocation resource of the present invention includes the steps of: determining frequency resource indices indicating a frequency resource to be allocated to a communication destination apparatus; adding a predetermined offset value to a start index or an end index of the frequency resource to be allocated among the frequency resource indices, and generating notification information to be reported to the communication destination apparatus; and transmits the notification information.

A method of allocating data of the present invention includes the steps of: receiving notification information that indicates frequency resource indices and that is transmitted by a communication destination apparatus; adding a predetermined offset value to a start index or an end index of the reported frequency resource based on the notification information, and calculating the allocated frequency resource; and allocating data to the allocated frequency resource.

Advantageous Effects of Invention

According to the present invention, limiting an increase in the number of signaling bits and enhancing frequency scheduling flexibility are possible.

BRIEF DESCRIPTION OF DRAWINGS

FIG. 8 shows an example operation of frequency resource allocation when a notification RBG index is associated with an allocation RBG index by equation 6;

FIG. 9 shows an example operation of the frequency resource allocation when the notification RBG index is associated with the allocation RBG index by equation 7;

FIG. 10 shows the number of signaling bits in Embodiment 1;

DESCRIPTION OF EMBODIMENT

Hereinafter, the embodiments of the present invention will be described in detail with reference to the drawings.

(Embodiment 1)

A communication system according to the present invention includes radio communication terminal apparatus 100 (hereinafter, simply referred to as a "terminal") and radio communication base station apparatus 200 (hereinafter, simply referred to as a "base station"). For example, terminal 100 is an LTE-A terminal and base station 200 is an LTE-A base station. Base station 200 determines an allocation resource to be allocated to data transmitted by terminal 100, and notifies terminal 100 of the determined allocation resource information. Terminal 100 allocates data to be transmitted, based on the information of the allocation resource notified by base station 200, and transmits the allocated data to base station 200.

Figure 4:
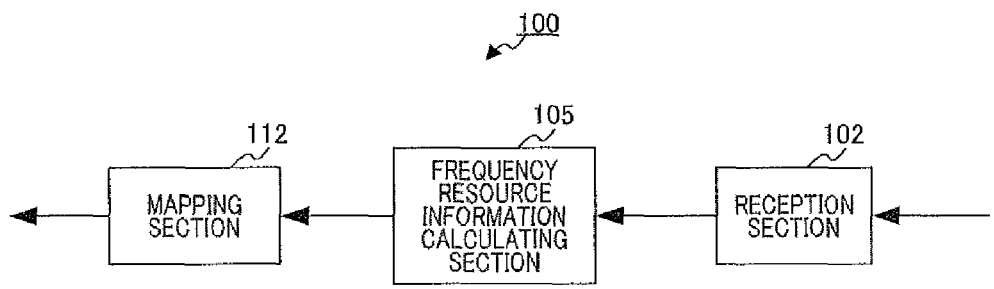
FIG. 4 is a main block diagram of a terminal according to Embodiment 1 of the present invention.

FIG. 4 is a main block diagram of terminal 100 according to Embodiment 1 of the present invention. In terminal 100, reception section 102 receives notification information that indicates frequency resource indices and that is transmitted by base station 200 that is a communication destination apparatus. Frequency resource information calculating section 105 adds a predetermined offset value to the start index or the end index of a frequency resource based on the notification information, and calculates the allocated frequency resource. Mapping section 112 allocates data to the allocated frequency resource.

Figure 5:
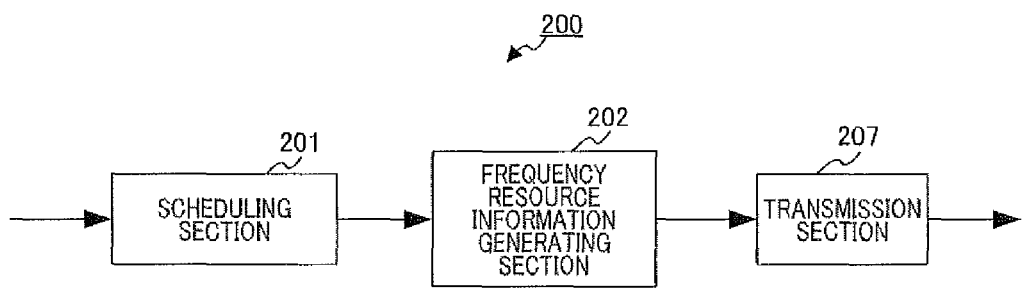
FIG. 5 is a main block diagram of a base station according to Embodiment 1 of the present invention.

FIG. 5 is a main block diagram of base station 200 according to Embodiment 1 of the present invention. In base station 200, scheduling section 201 determines frequency resource indices indicating a frequency resource to be allocated to terminal 100 that is a communication destination apparatus. Frequency resource information generating section 202 adds a predetermined offset value to the start index or the end index of the frequency resource to be allocated, among the frequency resource indices, and generates notification information to be reported to terminal 100. Transmission section 207 transmits the notification information.

Figure 6:
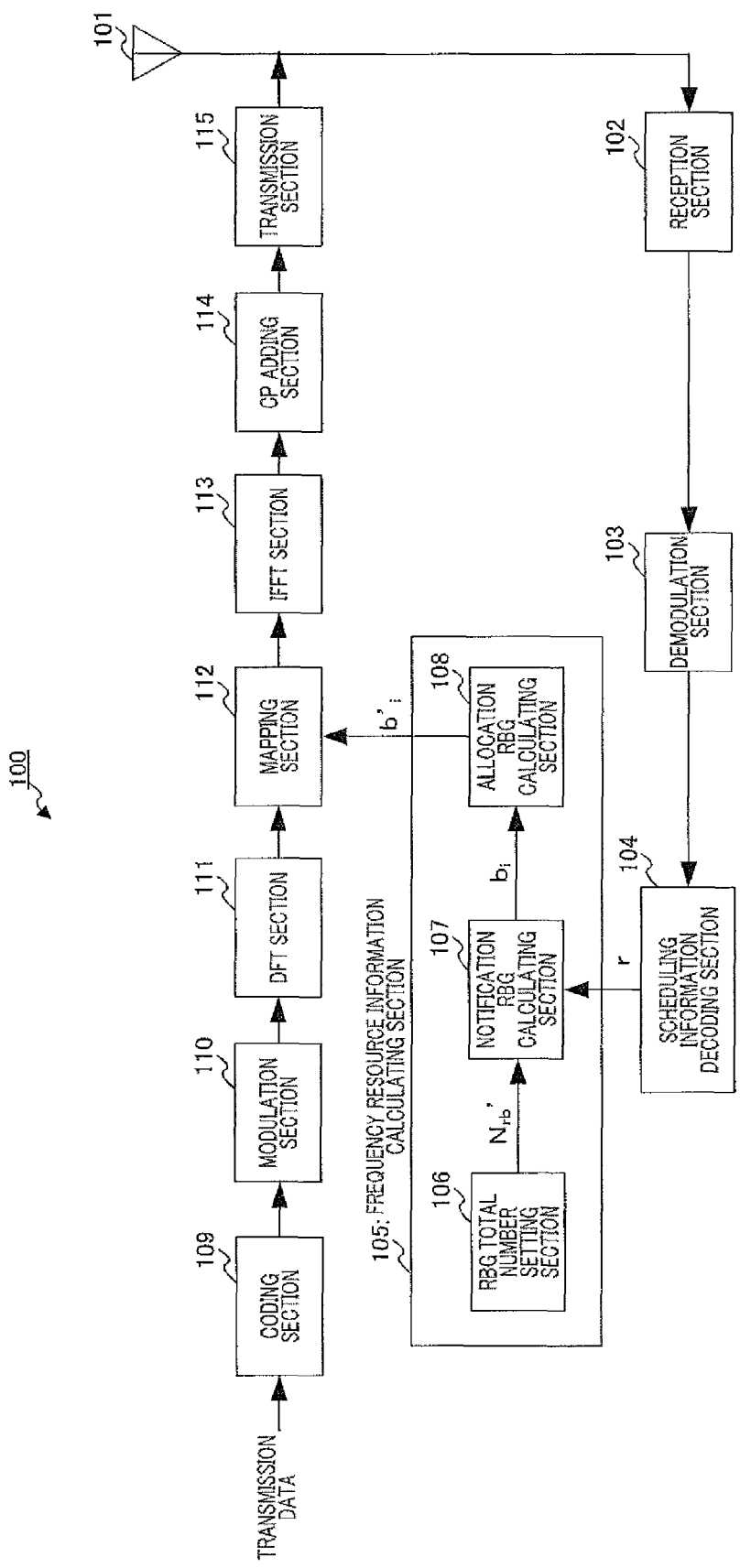
FIG. 6 is a block diagram showing a configuration of a radio communication terminal apparatus according to Embodiment 1 of the present invention.

FIG. 6 is a block diagram showing a configuration of terminal 100 according to Embodiment 1 of the present invention. The configuration of terminal 100 will be described below with reference to FIG. 6.

Reception section 102 receives the signal transmitted from base station 200 via antenna 101, performs reception processing such as down-conversion and A/D conversion on the received signal, and outputs the received signal subjected to the reception processing to demodulation section 103.

Demodulation section 103 demodulates the scheduling information that is transmitted from the base station and that is included in the received signal output from reception section 102, and outputs the demodulated scheduling information to scheduling information decoding section 104. The scheduling information includes, for example, notification information indicating frequency resource information of the transmission signal transmitted from the terminal.

Scheduling information decoding section 104 decodes the scheduling information output from demodulation section 103, and outputs the notification information included in the decoded scheduling information to notification RBG calculating section 107 of frequency resource information calculating section 105. The notification information r reported from the base station indicates a combinatorial index calculated by a predetermined equation using the start RBG index and the end RBG index of each cluster.

Frequency resource information calculating section 105 includes RBG total number setting section 106, notification RBG calculating section 107 and allocation RBG calculating section 108. Frequency resource information calculating section 105 calculates frequency resource allocating information ($b'_i$) indicating the frequency resource allocated to terminal 100 according to a rule described hereinafter, using notification information r output from scheduling information decoding section 104, and outputs the result to mapping section 112.

RBG total number setting section 106 outputs the total number of RBGs to be reported from the base station to terminal 100 (i.e., notification RBG total number $N_{rb}'$), to notification RBG calculating section 107. Notification RBG total number $N_{rb}'$ is calculated as the following equation 4. Thus, the total number of RBGs to be allocated to terminal 100 (i.e., allocation RBG total number $N_{rb}$) is uniquely determined by a system in advance, and is determined to be, for example, the total number of RBGs corresponding to a system bandwidth.

Notification RBG total number ($N_{rb}'$)=allocation RBG total number ($N_{rb}$)+1  (Equation 4)

Notification RBG calculating section 107 applies notification information r output from scheduling information decoding section 104, notification RBG total number $N_{rb}'$ output from RBG total number setting section 106, and the maximum number of clusters M defined by the system in advance, to the following equation 5. Accordingly, notification RBG calculating section 107 derives an information sequence in which the start RBG indices and the end RBG indices of clusters are arranged in the order of cluster indices (i.e., notification RBG index information $b_i$ of which definition is the same as equation 1), and outputs the result to allocation RBG calculating section 108. In this case, it is possible to uniquely derive $b_i$ from notification information r by setting a limitation that component elements of $b_i$ are arranged in ascending order and are different from each other.

[3]

$$r = \sum_{i=0}^{2M-1} \binom{N'_{rb} - b_i}{2M - i} = \sum_{i=0}^{2M-1} \binom{(N_{rb}+1) - b_i}{2M - i},$$

$$r \in \left\{0, \ldots, \binom{N_{rb}+1}{2M} - 1\right\}$$

(Equation 5)

Allocation RBG calculating section 108 calculates RBG index information (i.e., allocation RBG index information $b'_i = \{s'_0, e'_0, s'_1, e'_1, \ldots s'_{M-1}, e'_{M-1}\}$) to which terminal 100 actually allocates the transmission signal, based on notification RBG index information $b_i = \{s_0, e_0, s_1, e_1, \ldots s_{M-1}, e_{M-1}\}$ output from notification RBG calculating section 107, and outputs the result to mapping section 112. To be more specific, allocation RBG calculating section 108 calculates allocation RBG indices from notification RBG indices as shown in equation 6 or equation 7.

Allocation start RBG index ($s'_i$)=notification start RBG index ($s_i$)

Allocation end RBG index ($e'_i$)=notification end RBG index ($e_i$)−1  (Equation 6)

Allocation start RBG index ($s'_i$)=notification start RBG index ($s_i$)+1

Allocation end RBG index ($e'_i$)=notification end RBG index ($e_i$)  (Equation 7)

Also, the allocation RBG index information is a synonym of the frequency resource information.

Coding section 109 encodes transmission data and outputs the encoded data to modulation section 110. Modulation section 110 modulates the encoded data output from coding section 109, and outputs the modulated data to DFT section 111.

DFT section 111 performs Discrete Fourier Transform (DFT) processing on the modulated data output from modulation section 110, and outputs the modulated data subjected to the DFT processing to mapping section 112 as a data signal.

Mapping section 112 maps the data signal output from DFT section 111 to a resource of a frequency domain, based on allocation RBG index information ($b'_i$) output from allocation RBG calculating section 108. Specifically, the data signal is mapped to the range from allocation start RBG index ($s'_i$) to allocation end RBG index ($e'_i$) of the frequency band of cluster index i. Mapping section 112 performs this mapping for M clusters and outputs a transmission signal to which the data signal is mapped, to IFFT section 113.

IFFT section 113 performs Inverse Fast Fourier Transform (IFFT) processing on the transmission signal output from mapping section 112, and outputs the result to CP adding section 114. CP adding section 114 adds a signal that is the same as the signal in the end part of the transmission signal output from IFFT section 113, to the beginning of the transmission signal as Cyclic Prefix (CP), and outputs the result to transmission section 115.

Transmission section 115 performs transmission processing such as D/A conversion, up-conversion and amplification on the transmission signal to which the CP is added and that is output from CP adding section 114, and then transmits the transmission signal subjected to the transmission processing via antenna 101.

Figure 7:
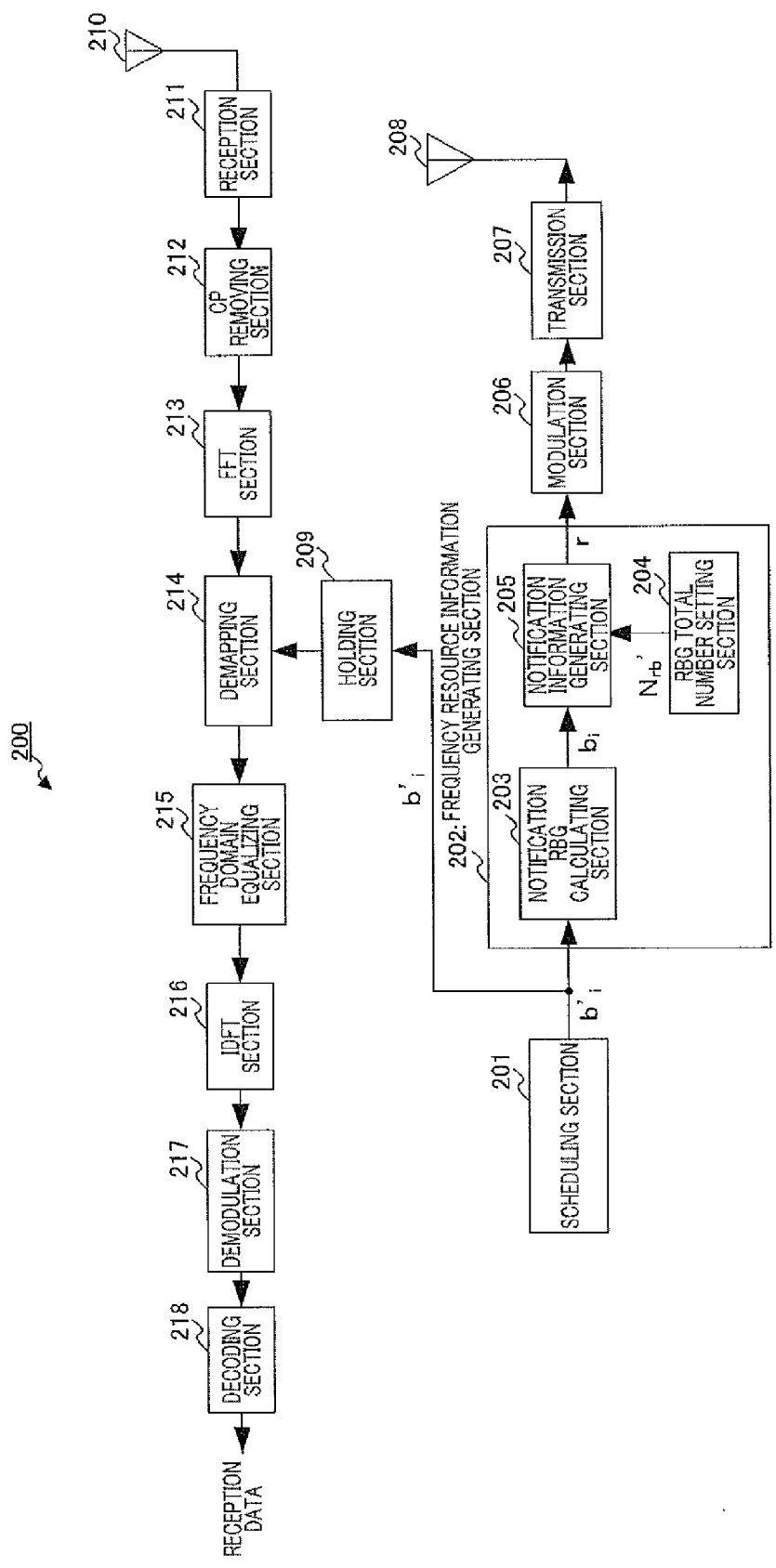
FIG. 7 is a block diagram showing a configuration of the base station according to Embodiment 1 of the present invention.

FIG. 7 is a block diagram showing a configuration of base station 200 of Embodiment 1 of the present invention. The configuration of base station 200 will be described below with reference to FIG. 7.

Scheduling section 201 determines allocation RBG index information (i.e., $b'_i=\{s'_0, e'_0, s'_1, e'_1, \ldots s'_{M-1}, e'_{M-1}\}$) as the frequency resource allocating information indicating frequency resources to be allocated to the terminal, and outputs the result to holding section 209 and notification RBG calculating section 203 of frequency resource information generating section 202.

Frequency resource information generating section 202 includes notification RBG calculating section 203, RBG total number setting section 204, and notification information generating section 205. Frequency resource information generating section 202 generates notification information r according to a below-mentioned rule using allocation RBG index information ($b'_i$) output from scheduling section 201, and outputs the result to modulation section 206.

Notification RBG calculating section 203 applies allocation RBG index information ($b'_i$) output from scheduling section 201 to equation 6 or equation 7, calculates RBG indices (i.e., notification RBG index information $b_i$) to be reported to the terminal, and outputs the result to notification information generating section 205.

RBG total number setting section 204 sets notification RBG total number $N_{rb}'$ (i.e., the total number of RBGs to be reported to the terminal) calculated by equation 4 to notification information generating section 205.

Notification information generating section 205 applies notification RBG index information ($b_i$) output from notification RBG calculating section 203 and notification RBG total number ($N_{rb}'$) set by RBG total number setting section 204 to equation 5. Notification information generating section 205 then generates and outputs notification information r to modulation section 206.

Modulation section 206 modulates notification information r output from notification information generating section 205, and outputs the result to transmission section 207 as a control signal. Transmission section 207 performs transmission processing such as D/A conversion, up-conversion, and amplification on the control signal output from modulation section 206, and transmits the control signal subjected to the transmission processing via antenna 208.

Holding section 209 holds allocation RBG index information ($b'_i$) output from scheduling section 201 in order to receive a signal transmitted from the terminal to which the frequency resources are allocated. When receiving the signal from a desired terminal, holding section 209 outputs held allocation RBG index information ($b'_i$) to demapping section 214.

Reception section 211 receives the signal, which is transmitted from the terminal, via antenna 210, and performs reception processing such as down-conversion and A/D conversion on the received signal. Reception section 211 outputs the received signal subjected to the reception processing to CP removing section 212.

CP removing section 212 removes the CP added to the beginning of the received signal output from reception section 211 and outputs the result to FFT section 213. FFT section 213 performs FFT processing on the received signal from which the CP is removed and that is output from CP removing section 212, to convert the received signal into a frequency domain signal, and outputs the converted frequency domain signal to demapping section 214.

Demapping section 214 as an extraction means extracts a data signal corresponding to the transmission band of the desired terminal from the frequency domain signal output from FFT section 213 in accordance with the allocation RBG index information output from holding section 209. Demapping section 214 outputs the extracted data signal to frequency domain equalizing section 215.

Frequency domain equalizing section 215 performs equalization processing on the data signal output from demapping section 214, and outputs the data signal to IDFT section 216. IDFT section 216 performs Inverse Discrete Fourier Transform (IDFT) processing on the data signal on which the equalization processing is performed and that is output from frequency domain equalizing section 215, and outputs the data signal to demodulation section 217.

Demodulation section 217 applies demodulation processing to the data signal that is subjected to the IDFT processing and that is output from IDFT section 216, and outputs the data signal to decoding section 115. Decoding section 218 performs decoding processing on the demodulated signal output from demodulation section 217 and extracts received data.

Next, the operation of the above-mentioned allocation RBG calculating section 108 of terminal 100 will be described. An example where the maximum number of clusters M is two will be shown below.

FIG. 8 shows an example operation to allocate frequency resources when notification RBG indices are associated with allocation RBG indices by equation 6. FIG. 8 shows an example where notification RBG total number $N_{rb}'=9$, and allocation RBG total number $N_{rb}=8$, and notification RBG index information $b_i$ reported from the base station to the terminal is set to $b_i=\{s_0, e_0, s_1, e_1\}=\{1, 3, 8, 9\}$.

In the present case, allocation RBG index information $b'_i$ to be actually allocated to the terminal is calculated by equation 6 as $b'_i=\{s'_0=s_0, e'_0=e_0-1, s'_1=s_1, e'_1=e_1-1\}=\{1, 2, 8, 8\}$. Accordingly, shaded RBG indices (#1, #2, and #8) of FIG. 8 are the frequency resources to be allocated. In other words, when the allocation start RBG index is equal to the allocation end RBG index as the above-mentioned $s'_1$ and $e'_1$, it is possible to allocate a cluster bandwidth of one RBG.

FIG. 9 shows an example operation to allocate frequency resources when notification RBG indices are associated with allocation RBG indices by equation 7. FIG. 9 shows an example where notification RBG total number $N_{rb}'=9$, allocation RBG total number $N_{rb}=8$, and notification RBG index information $b_i$ reported from the base station to the terminal is set to $b_i\{s_0, e_0, s_1, e_1\}=\{0, 2, 7, 8\}$.

In the present case, allocation RBG index information $b'_i$ to be actually allocated to the terminal is calculated by equation 7 as $b'_i=\{s'_0=s_0+1, e'_0=e_0, s'_1=s_1+1, e'_1=e_1=\}\{1, 2, 8, 8\}$. Accordingly, shaded RBG indices (#1, #2, and #8) of FIG. 9 are the frequency resources to be allocated. In other words, when the allocation start RBG index is equal to the allocation end RBG index as in FIG. 8, it is possible to allocate a cluster bandwidth of one RBG.

The number of signaling bits required for notification information r in Embodiment 1 can be calculated by the following equation 8.

[4]

$$L = \left\lceil \log_2 \binom{N_{rb}+1}{2M} \right\rceil \quad \text{(Equation 8)}$$

Figure 1A:
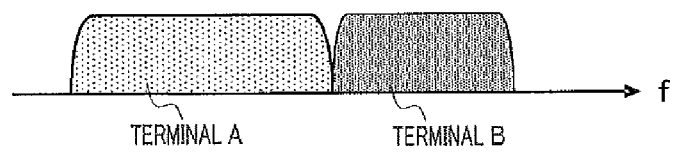
FIG. 1 shows contiguous band allocation and non-contiguous band allocation.
Figure 1B:
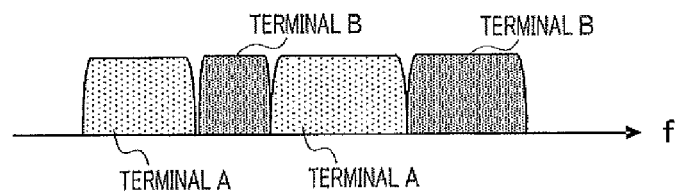
Figures 2, 3:
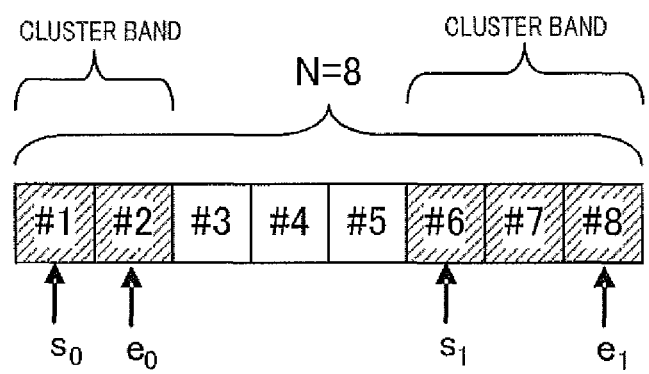
FIG. 2 shows the numbers of signaling bits disclosed in non-patent literature 1.
FIG. 3 shows an example of the non-contiguous band allocation of the number of clusters M=2 using a technique disclosed in non-patent literature 1.

FIG. 10 shows the numbers of signaling bits Ls, which are calculated by equation 8 at $N_{rb}=25$ RBGs and $N_{rb}=50$ RBGs in the case of M=2. Compared with FIG. 2, FIG. 10 shows that the number of signaling bits does not increase.

According to Embodiment 1, in a method of reporting a frequency resource for the non-contiguous band allocation, notification information r calculated by the predetermined equation while the total number of RBGs to be reported is set as "RBG total number +1," and a predetermined offset value of 1 or −1 is added to any one of the start RBG indices or the end RBG indices among the notification RBG indices to be reported to the terminal. The calculated notification information r is transmitted from the base station to the terminal, and the allocation RBG indices, to which the terminal actually allocates the transmission signal, is derived. Thus, the base station can freely allocate the cluster bandwidth in RBG units including one RBG, to the terminal. In addition, enhancement in frequency scheduling flexibility and the non-contiguous band allocation can improve system performance. Also, the increase in the number of signaling bits can be minimized.

Also, the conventional technique can be reused with in a simple configuration, which is to add the predetermined offset, by using a combinatorial index as notification information r. There is no need to implement, for example, exceptional processing when the allocation RBG indices are derived from the notification RBG indices, and thus it is enough to have a simple transmission reception configuration.

Figures 11, 12:
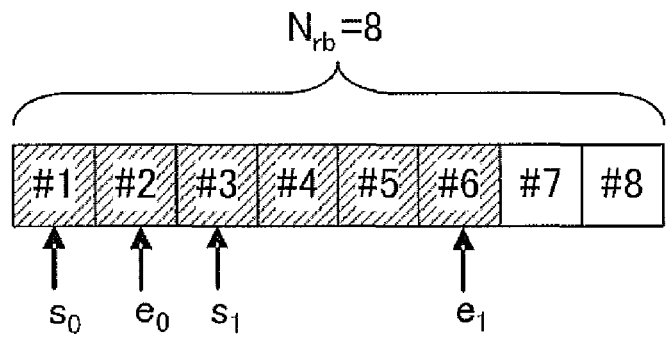
FIG. 11 shows the contiguous band allocation.
FIG. 12 shows a comparison result of the number of conventional signaling bits and the number of signaling bits in Embodiment 1.

In the present embodiment, it is not possible to report contiguous band allocation that is available in the conventional technique as shown in FIG. 11. However, in LTE-Advanced, it is possible to constantly transmit a control signal for the contiguous band allocation referred to as DCI Format 0 from the base station to the terminal, in addition to the control signal for the non-contiguous band allocation.

A method of reporting a frequency resource of DCI Format 0 is to designate one cluster allocation by performing allocation limited to one cluster on a per RB basis (contiguous band allocation) and by reporting two RB indices of a start RB index (corresponding to $s_0$) and an end RB index (corresponding to $e_0$). In the case of performing frequency resource allocation shown in FIG. 11, only start RB index in RBG index 1 and end RB index in RBG index 6 need to be reported.

It is possible to indicate the contiguous band allocation shown in FIG. 11 by switching the method of reporting the frequency resources depending on the number of clusters that the base station allocates to the terminal. In other words, one or more cluster bands can be allocated to the terminal by using the method of allocating the frequency resources for the non-contiguous band allocation described in Embodiment 1 when the number of clusters is two or more, and by using the method (e.g., DCI format 0) for allocating the frequency resources for the contiguous band allocation when the number of clusters is one.

(Embodiment 2)

In Embodiment 1, the number of necessary signaling bits is calculated by equation 8. As a result, the number of signaling bits may increase one bit, compared with the conventional technique using equation 3 for the calculation.

FIG. 12 shows the comparison result of the respective numbers of signaling bits calculated by equation 8 in Embodiment 1 and by equation 3 in the conventional technique. According to FIG. 12, in a case where the allocation RBG total numbers $N_{rb}$ of 16, 19, 22, and 26 RBG, the respective numbers of signaling bits in Embodiment 1 increase one bit.

The configuration of a terminal according to Embodiment 2 of the present invention is the same as the configuration shown in FIG. 6 of Embodiment 1. Although some of functions may differ, these functions will be explained with reference to FIG. 6.

RBG total number setting section 106 outputs the total number ($N_{rb}'$) of RBG reported from a base station to the terminal, to notification RBG calculating section 107. When equation 9 holds true (that is, the number of signaling bits in Embodiment 1 is one bit larger than the number of conventional signaling bits), the notification RBG total number is calculated as notification RBG total number ($N_{rb}'$)=allocation RBG total number ($N_{rb}$). When equation 9 is not valid, the notification RBG total number is calculated by equation 4 as in Embodiment 1.

[5]

$$\left\lceil \log_2 \binom{N_{rb}}{2M} \right\rceil < \left\lceil \log_2 \binom{N_{rb}+1}{2M} \right\rceil \quad \text{(Equation 9)}$$

The configuration of a base station according to Embodiment 2 of the present invention is the same as the configuration shown in FIG. 7 of Embodiment 1 except for the function of RBG total number setting section 204. However, because RBG total number setting section 204 is the same as the above-mentioned RBG total number setting section 106 of a terminal in Embodiment 2, the detailed description thereon will be omitted.

As described above, while operating as Embodiment 1 when equation 9 is not valid, RBG total number setting section 106 matches notification RBG total number $N_{rb}'$ to allocation RBG total number $N_{rb}$ as in the conventional technique when equation 9 holds true (as shown in FIG. 12, the number of signaling bits is one bit larger than the conventional technique). Thus, the number of signaling bits required for notification information r can be calculated by equation 3, and therefore it is possible to maintain the same number of signaling bits as the conventional technique.

Figure 13:
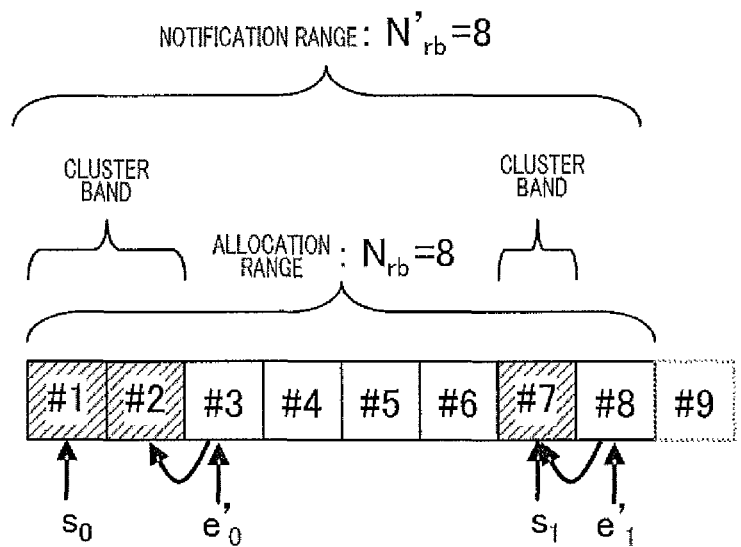
FIG. 13 shows an example operation of frequency resource allocation in Embodiment 2 of the present invention.

When equation 9 is not valid, the frequency resources are allocated as shown in FIG. 8. Meanwhile, when equation 9 holds true, in the frequency resources allocation, the allocatable range is reduced by one RBG as shown in FIG. 13 to prevent an increase in the number of signaling bits.

By this means, Embodiment 2 has a limitation in that one RBG of the end of the system band (e.g., RBG index 8 in FIG. 13) cannot be used for allocation. However, in LTE-Advanced, both ends of the system band are generally used for transmitting control channel (e.g., PUCCH). The frequency scheduling gain is not decreased much by such a limitation, even when data channel (e.g., PUSCH) is not allocated to the both ends of the system band. Thus, the increase in the number of signaling bits can be prevented while deterioration in performance is minimized.

According to Embodiment 2, the increase in the number of signaling bits can be prevented by matching a notification RBG total number to an allocation RBG total number only when the number of signaling bits required for notification information r is one bit larger than the conventional technique.

(Embodiment 3)

The configuration of a terminal according to Embodiment 3 of the present invention is similar to the configuration shown in FIG. 6 of Embodiment 1. Although some functions may differ, these functions will be explained with reference to FIG. 6.

RBG total number setting section 106 always calculates the total number ($N_{rb}'$) of RBG to be reported from a base station to the terminal so that notification RBG total number ($N_{rb}'$)=allocation RBG total number ($N_{rb}$) holds true, and outputs the result to notification RBG calculating section 107.

Allocation RBG calculating section 108 calculates allocation RBG used by the terminal to actually transmit a signal, based on notification RBG index information b-hd i={$s_0, e_0, s_1, e_1, \ldots s_{M-1}, e_{M-1}$} output from notification RBG calculating section 107. To be more specific, allocation RBG calculating section 108 calculates an allocation start RBG index in the cluster (i.e., cluster index 0) located in the lowest frequency band by setting allocation start RBG index ($s'_i$)= notification start RBG index ($s_i$)+1, and an allocation end RBG index in the cluster (i.e., cluster index M−1) located in the highest frequency band by setting allocation end RBG index ($e'_i$)=notification end RBG index ($e_i$)−1.

The configuration of a base station according to Embodiment 3 of the present invention is the same as the configuration shown in FIG. 7 in Embodiment 1 except for functions of notification RBG calculating section 203 and RBG total number setting section 204. RBG total number setting section 204 is the same as RBG total number setting section 106 of the terminal according to Embodiment 3, and therefore a detailed description thereon will be omitted.

Based on allocation RBG index information ($b'_i$) output from scheduling section 201, notification RBG calculating section 203 sets notification RBG index information ($b_i$) to be reported to a terminal by calculating a notification start RBG index in the cluster (i.e., cluster index 0) located in the lowest frequency band to be allocation start RBG index ($s'_i$)=notification start RBG index ($s_i$)+1, and a notification end RBG index in the cluster (i.e., cluster index M−1) located in the highest frequency band to be allocation end RBG index ($e'_i$)= notification end RBG index ($e_i$)−1. Accordingly, notification RBG calculating section 203 outputs the notification RBG index information ($b_i$) to notification information generating section 205.

Next, the operation in allocation RBG calculating section 108 in the above-mentioned terminal will be described. Hereinafter, an example where the maximum number of clusters M is two will be described.

Figure 14:
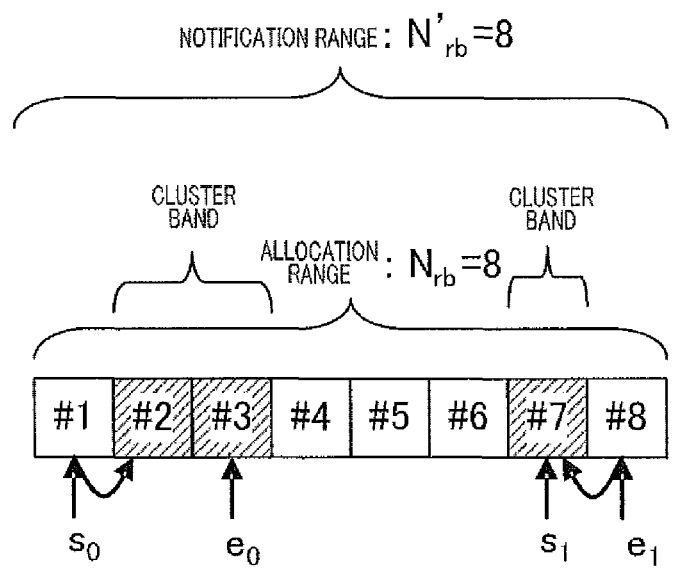
FIG. 14 shows an example operation of frequency resource allocation when the notification RBG index is associated with the allocation RBG index in Embodiment 3 of the present invention.

FIG. 14 shows an example operation of frequency resource allocation when notification RBG indices are associated with allocation RBG indices in Embodiment 3 of the present invention. FIG. 14 shows a case where notification RBG total number $N_{rb}'$=allocation RBG total number Nrb=8 and notification RBG index information $b_i$ reported from the base station is set to $b_i$={$s_0, e_0, s_1, e_1$}={1, 3, 7, 8}.

In this case, allocation RBG index information to be actually allocated to the terminal is calculated by notification RBG calculating section 107 as $b'_i$={$s'_0=s_0+1, e_0'=e_0, s'_1=s_1, e'_1=e_1-1$}={2, 3, 7, 7}. Accordingly, the shaded RBG indices (#2, #3, and #7) of FIG. 14 are the frequency resources to be allocated.

Figure 15:
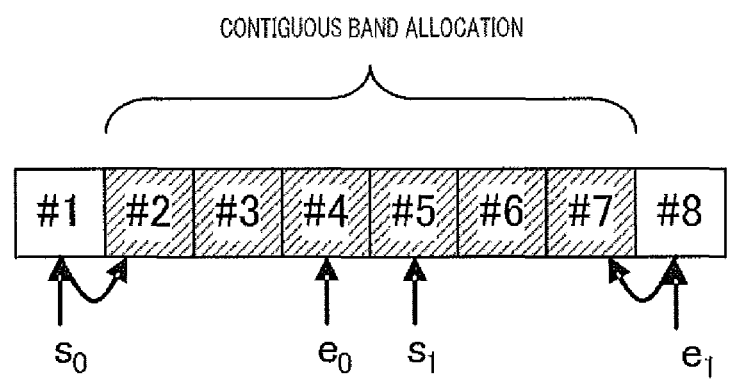
FIG. 15 shows contiguous band allocation in Embodiment 3 of the present invention.

The number of signaling bits required for notification information r of Embodiment 3 can be calculated by equation 3, and therefore the same number of signaling bits as the conventional technique can be maintained. Also, contiguous band allocation can be performed as shown in FIG. 15.

According to Embodiment 3, it is possible to freely allocate a cluster bandwidth in RBG units including one RBG, by matching the total number of RBGs to be reported and the total number of RBGs to be allocated, and setting the allocation start RBG index to be a notification start RBG index +1 in the cluster located at the lowest frequency band and the allocation end RBG index to be a notification end RBG index −1 in the cluster located at the highest frequency band.

In Embodiment 3, there is a limitation that both ends of a system band (e.g., RBG indices 1 and 8 in FIG. 14) cannot be used for allocation. However, as described in Embodiment 2, the both ends of the system band are generally used for transmitting control channel (e.g., PUCCH). Accordingly, such a limitation does not decrease frequency scheduling gain much, even when data channel (e.g., PUSCH) is not allocated to the both ends of the system band. Thus, the increase in the number of signaling bits can be prevented while deterioration in performance is minimized.

In addition, the above embodiments have been described using the case of two clusters as an example. However, the present invention is not limited to the present case, and the same can be applied to three clusters or more.

Although a case has been described with the above embodiments as an example where the present invention is implemented with hardware, the present invention can be implemented with software in cooperation with hardware.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI," depending on the differing extents of integration.

The method of implementing integrated circuitry is not limited to LSI, and implementation by means of dedicated circuitry or a general-purpose processor may also be used. After LSI manufacture, utilization of an Field Programmable Gate Array (FPGA) or a reconfigurable processor where connections and settings of circuit cells in an LSI can be regenerated is also possible.

In the event of the introduction of an integrated circuit implementation technology whereby LSI is replaced by a different technology as an advance in or derivation from semiconductor technology, integration of the function blocks may of course be performed using that technology. The application of biotechnology is also possible.

Although the present invention has been described above with embodiments using antennas, the present invention is equally applicable to antenna ports.

An antenna port refers to a logical antenna comprised of one or a plurality of physical antennas. Thus, an antenna port is not limited to represent one physical antenna, and may include an array antenna formed by a plurality of antennas.

For example, 3GPP LTE does not define the number of physical antennas for forming an antenna port, but defines an antenna port as a minimum unit for transmitting different reference signals from a base station.

In addition, an antenna port may be defined as a minimum unit to multiply weighting of a precoding vector.

The disclosure of Japanese Patent Application No. 2010-140748, filed on Jun. 21, 2010, including the specification, drawings and abstract, is incorporated herein by reference in its entirety.

INDUSTRIAL APPLICABILITY

A radio communication apparatus, a method of reporting an allocation resource, and a method of allocating data according to the present invention are applicable to, for example, a mobile communication system such as LTE-Advanced.

REFERENCE SIGNS LIST

101, 208, 210 Antenna
102, 211 Reception section 103, 217 Demodulation section
104 Scheduling information decoding section
105 Frequency resource information calculating section
106, 204 RBG total number setting section
107, 203 Notification RBG calculating section
108 Allocation RBG calculating section
109 Coding section
110, 206 Modulation section
111 DFT section
112 Mapping section
113 IFFT section
114 CP adding section
115, 207 Transmission section
201 Scheduling section
202 Frequency resource information generating section
205 Notification information generating section
209 Holding section
212 CP removing section
213 FFT section
214 Demapping section
215 Frequency domain equalizing section
216 IDFT section
218 Decoding section

The invention claimed is:

1. A base station apparatus comprising:
an information generating section that generates resource allocation information that indicates at least two clusters of resource blocks to be allocated to a terminal apparatus, each cluster including one or more consecutive resource block groups (RBGs), wherein the at least two clusters are located on frequency positions separated from each other, and wherein the resource allocation information includes a combinatorial index that is calculated by using: a starting RBG index ($s_1$) of a first cluster; an index ($e_1$) obtained by adding one to an ending RBG index of the first cluster: a starting RBG index ($s_2$) of a second cluster; an index ($e_2$) obtained by adding one to an ending RBG index of the second cluster; and a number N that is obtained by adding one to a total number of RBGs included in an uplink system bandwidth; and
a transmission section that transmits the resource allocation information.

2. The base station apparatus according to claim 1 wherein, when the starting RBG index equals its corresponding ending RBG index, a single RBG is allocated for a cluster with the starting RBG index.

3. The base station apparatus according to claim 1 wherein the combinatorial index is generated based on the following formula:

$$\sum_{i=0}^{2M-1} \binom{N-b_i}{2M-i}, b_i = \{s_1, e_1, s_2, e_2\}, s_1 < e_1 < s_2 < e_2 \quad [1]$$

in which M represents the number of resources allocated in the uplink and is 2.

4. A terminal apparatus comprising:
a reception section that receives resource allocation information that indicates at least two clusters of resource blocks allocated by a base station apparatus, each cluster including one or more consecutive resource block groups (RBGs), wherein the at least two clusters are located on frequency positions separated from each other, and wherein the resource allocation information includes a combinatorial index that is calculated by using: a starting RBG index ($s_1$) of a first cluster; an index ($e_1$) obtained by adding one to an ending RBG index of the first cluster, a starting RBG index ($s_2$) of a second cluster: an index ($e_2$) obtained by adding one to an ending RBG index of the second cluster; and a number N that is obtained by adding one to a total number of RBGs included in an uplink system bandwidth; and
a transmission section that transmits data using the at least two clusters based on the resource allocation information.

5. The terminal apparatus according to claim 4 wherein, when the starting RBG index s equals its corresponding ending RBG index, a single RBG is allocated for a cluster with the starting RBG index.

6. The terminal apparatus according to claim 4, wherein the combinatorial index is generated based on the following formula:

$$\sum_{i=0}^{2M-1} \binom{N-b_i}{2M-i}, b_i = \{s_1, e_1, s_2, e_2\}, s_1 < e_1 < s_2 < e_2 \quad [2]$$

in which M represents the number of resources allocated in the uplink and is 2.

7. A method of radio transmission, the method comprising the steps of:
generating resource allocation information that indicates at least two clusters of resource blocks to be allocated to a terminal apparatus in an uplink, each cluster including one or more consecutive resource block groups (RBGs), wherein the at least two clusters are located on frequency positions separated from each other, and wherein the resource allocation information includes a combinatorial index that is calculated by using: a starting RBG index ($S_1$) of a first cluster; an index ($e_1$) obtained by adding one to an ending RBG index of the first cluster; a starting RBG index ($s_2$) of a second cluster; an index ($e_2$) obtained by adding one to an ending RBG index of the second cluster and a number N that is obtained by adding one to a total number of RBGs included in an uplink system bandwidth; and
transmitting the resource allocation information.

8. A method of radio reception, the method comprising the steps of:
receiving resource allocation information indicating at least two clusters of resource blocks allocated by a base station apparatus, each cluster including one or more consecutive resource block groups RBGs, wherein the at least two clusters are located on frequency positions separated from each other and wherein the resource allocation information includes a combinatorial index that is calculated by using: a starting RBG index ($s_1$) of a first cluster; an index ($e_1$) obtained by adding one to an ending RBG index of the first cluster; a starting RBG index ($s_2$) of a second cluster; an index ($e_2$) obtained by adding one to an ending RBG index of the second cluster; and a number N that is obtained by adding one to a total number of RBGs included in an uplink system bandwidth; and
transmitting data using at least two clusters based on the resource allocation information.

* * * * *

UNITED STATES PATENT AND TRADEMARK OFFICE
CERTIFICATE OF CORRECTION

PATENT NO. : 9,008,022 B2  
APPLICATION NO. : 13/702901  
DATED : April 14, 2015  
INVENTOR(S) : Takashi Iwai et al.

Page 1 of 1

It is certified that error appears in the above-identified patent and that said Letters Patent is hereby corrected as shown below:

In the specification

Column 6, Lines 25-26:
"Allocation end RBG index ($e'_1$) = notification end RBG index ($e_1$)-1" should read, --Allocation end RBG index ($e'_i$) = notification end RBG index ($e_i$)-1--.

Column 13, Line 36:
"ending RBG index of the first cluster: a starting RBG index" should read, --ending RBG index of the first cluster; a starting RBG index--.

In the claims

Column 14, Lines 5-6:
"index of the first cluster, a starting RBG index ($s_2$) of a second cluster: an index ($e_2$) obtained by adding one to" should read, --index of the first cluster; a starting RBG index ($s_2$) of a second cluster; an index ($e_2$) obtained by adding one to--.

Signed and Sealed this  
Thirty-first Day of May, 2016

Michelle K. Lee  
*Director of the United States Patent and Trademark Office*